United States Patent
Xue et al.

(10) Patent No.: US 11,940,813 B2
(45) Date of Patent: Mar. 26, 2024

(54) MOWER FLEET MANAGEMENT DEVICE, METHOD, AND SYSTEM

(71) Applicant: Globe (Jiangsu) Co., Ltd., Changzhou (CN)

(72) Inventors: Jiafu Xue, Changzhou (CN); Shiyuan Ding, Changzhou (CN); Jing Wang, Changzhou (CN); Qunli Wei, Changzhou (CN); Hui Chen, Changzhou (CN); Dongdong Shi, Changzhou (CN)

(73) Assignee: Globe (Jiangsu) Co., Ltd., Changzhou (CN)

( * ) Notice: Subject to any disclaimer, the term of this patent is extended or adjusted under 35 U.S.C. 154(b) by 238 days.

(21) Appl. No.: 17/326,308

(22) Filed: May 20, 2021

(65) Prior Publication Data
US 2021/0365044 A1 Nov. 25, 2021

(30) Foreign Application Priority Data
May 22, 2020 (CN) .......................... 202010439031.2

(51) Int. Cl.
*G05D 1/02* (2020.01)
*A01D 34/00* (2006.01)
(Continued)

(52) U.S. Cl.
CPC ......... *G05D 1/0289* (2013.01); *A01D 34/008* (2013.01); *G01C 21/3826* (2020.08);
(Continued)

(58) Field of Classification Search
CPC .. G05D 1/0289; G05D 1/0022; G05D 1/0027; G05D 2201/0208; A01D 34/008; G01C 21/3826
See application file for complete search history.

(56) References Cited

U.S. PATENT DOCUMENTS

| 2008/0097645 | A1* | 4/2008 | Abramson | .............. G01S 11/06 700/258 |
| 2015/0148951 | A1* | 5/2015 | Jeon | ........................ A47L 11/24 901/30 |

(Continued)

FOREIGN PATENT DOCUMENTS

| CN | 107343421 A | 11/2017 |
| CN | 108073164 A | 5/2018 |

(Continued)

OTHER PUBLICATIONS

Search Report for corresponding application 202010439031.2 filed May 22, 2020, dated Feb. 6, 2023.

*Primary Examiner* — Hunter B Lonsberry
*Assistant Examiner* — Harrison Heflin

(57) ABSTRACT

The mower fleet management device is configured to control a plurality of mowers to work in collaboration. Each of the mowers includes an on-board communication module and an on-board positioning and navigation module. The mower fleet management device includes: a map loading module configured to acquire a map of a working land parcel; a control terminal communication module configured to wirelessly communicate with the on-board communication modules to acquire status information of the mowers; and a working region assigning module configured to assign a working region to each of the mowers according to the status information and the map. The on-board positioning and navigation module of each of the mowers guides the mower to work in the corresponding working region according to the assigned working region.

18 Claims, 6 Drawing Sheets

(51) Int. Cl.
*G01C 21/00* (2006.01)
*G05D 1/00* (2006.01)

(52) U.S. Cl.
CPC ......... *G05D 1/0022* (2013.01); *G05D 1/0027* (2013.01); *G05D 2201/0208* (2013.01)

(56) References Cited

U.S. PATENT DOCUMENTS

| | | | | |
|---|---|---|---|---|
| 2015/0296707 A1* | 10/2015 | Fukuda | ................ | A01B 69/008 |
| | | | | 701/25 |
| 2015/0348419 A1* | 12/2015 | Matthews | ................ | G08G 1/20 |
| | | | | 701/117 |
| 2016/0282866 A1* | 9/2016 | Yamamura | ........... | G05D 1/0265 |
| 2016/0320774 A1* | 11/2016 | Kuhara | ................ | G05D 1/0289 |
| 2018/0364739 A1* | 12/2018 | Foster | ................... | G05D 1/0219 |
| 2019/0278269 A1* | 9/2019 | He | .......................... | A01G 25/09 |
| 2020/0125116 A1* | 4/2020 | Wang | ..................... | B25J 11/0085 |
| 2020/0221633 A1* | 7/2020 | Einecke | ................ | G08C 17/02 |
| 2020/0230806 A1* | 7/2020 | Choi | ................... | A47L 11/4072 |
| 2021/0085146 A1* | 3/2021 | Cho | ...................... | G05D 1/0044 |
| 2021/0272438 A1* | 9/2021 | Askenmalm | ......... | G05D 1/0259 |

FOREIGN PATENT DOCUMENTS

| | | |
|---|---|---|
| CN | 108628314 A | 10/2018 |
| CN | 108965803 A | 12/2018 |

\* cited by examiner

MOWER FLEET MANAGEMENT DEVICE, METHOD, AND SYSTEM

FIELD OF TECHNOLOGY

The present invention relates to a mower fleet management device, a mower fleet management method, and a mower fleet management system.

BACKGROUND

A mower is a gardening tool used for mowing lawns, vegetation, and the like, and generally includes a walking system, a cutter system, and a power source. The power source may be a gasoline engine, a battery, or the like. A battery-powered mower is popular to users because of low noise and zero pollution. However, due to constraints of battery energy density, battery production costs, and other factors, the battery carried on the mower has a very limited charge amount, resulting in a relatively small working area of the mower in each operation. In case of a relatively large lawn area, a user requires a plurality of batteries for replacement to achieve uninterrupted work. Nevertheless, a user still needs to spend a very long time to complete lawn mowing. If a plurality of mowers is simultaneously used, a plurality of operators will be simultaneously required. As a result, labor costs will increase.

In view of the above problems, a mower fleet management device is required to resolve the above problems.

SUMMARY

The present disclosure provides a mower fleet management device configured to control a plurality of mowers to work in collaboration. Each of the mowers includes an on-board communication module and an on-board positioning and navigation module. The mower fleet management device includes: a map loading module configured to acquire a map of a working land parcel for use by the on-board positioning and navigation modules; a control terminal communication module configured to wirelessly communicate with the on-board communication modules to acquire status information of the mowers or transmit a control command to the mowers, where the status information includes charge amounts of battery packs, speeds, and mowing widths of the mowers; and a working region assigning module configured to assign a working region to each of the mowers according to the status information and the map. The on-board positioning and navigation module of each of the mowers guides the mower to work in the corresponding working region according to the assigned working region.

The present disclosure further provides a mower fleet management method for controlling a plurality of mowers to work in collaboration, including the following steps: S1: acquiring a map of a working land parcel and status information of the mowers, where the status information includes charge amounts of battery packs, speeds, and mowing widths of the mowers; and S2: assigning a working region to each of the mowers according to the status information and the map and guiding each of the mowers to work in the corresponding working region.

The present disclosure further provides a mower fleet management system, including: a mower fleet including a plurality of mowers, where each of the mowers includes an on-board communication module and an on-board positioning and navigation module; and a mower fleet management device including: a map loading module configured to acquire a map of a working land parcel for use by the on-board positioning and navigation modules; a control terminal communication module configured to communicate with the on-board communication modules to acquire status information of the mowers or transmit a control command to the mowers, where the status information includes charge amounts of battery packs, speeds, and mowing widths of the mowers; a working region assigning module configured to assign a working region to each of the mowers according to the status information and the map. The on-board positioning and navigation module of each of the mowers guides the mower to work in the corresponding working region according to the assigned working region.

The present invention has the following beneficial effects: the mower fleet management device of the present invention can control a plurality of unmanned mowers to work in collaboration, thereby effectively improving working efficiency and reducing labor costs.

DETAILED DESCRIPTION

To make the objectives, technical solutions and advantages of the present invention more clearly, the present invention is further described in detail below with reference to the accompanying drawings and specific embodiments.

Figure 1:
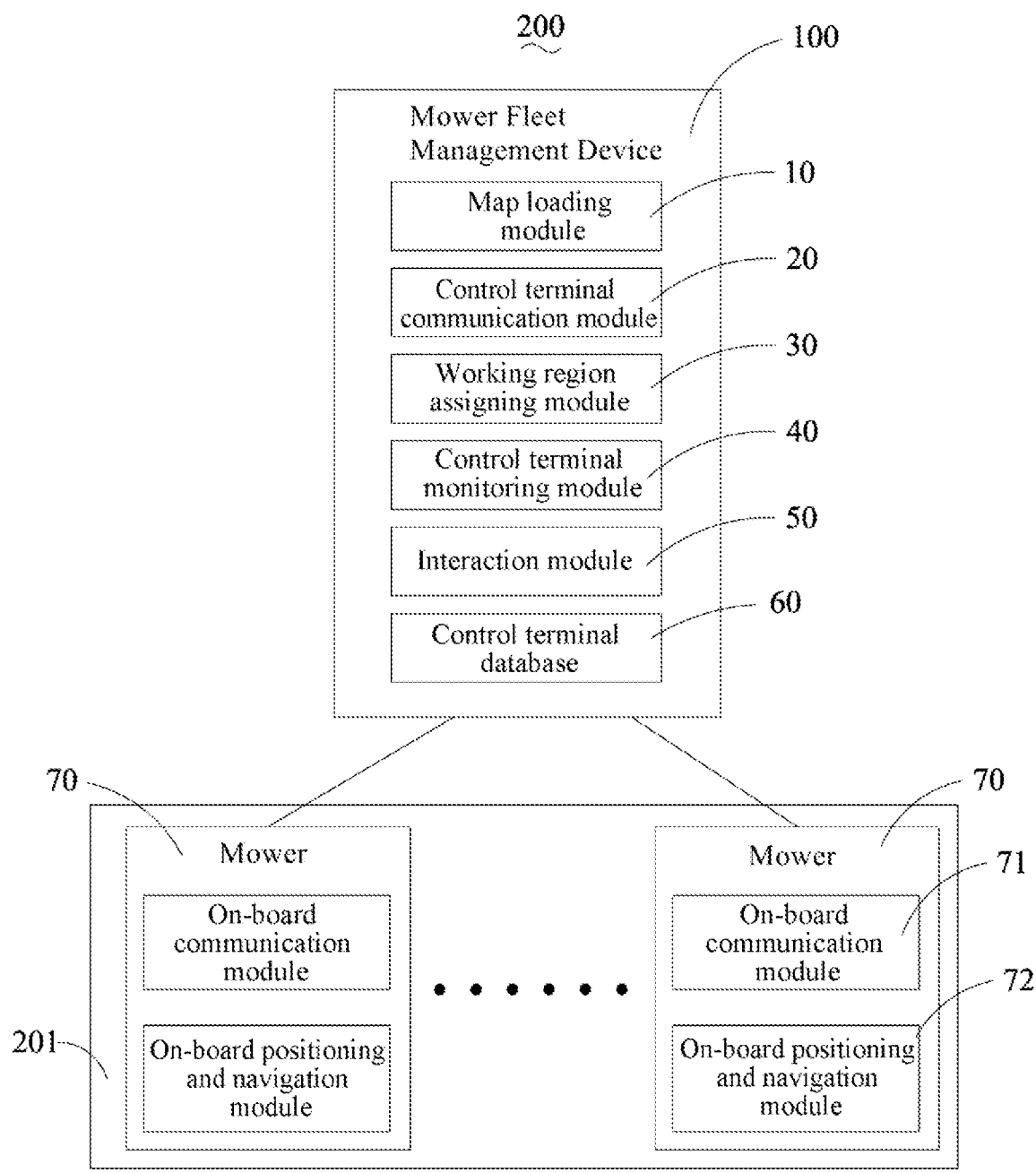
FIG. 1 is a schematic diagram of modules of a mower fleet management system according to an embodiment of the present invention.

Referring to FIG. 1, the present disclosure provides a mower fleet management device 100 configured to control a plurality of mowers 70 to work in collaboration to mow lawn quickly. Each of the plurality of mowers 70 includes an on-board communication module 71 and an on-board positioning and navigation module 72.

Figure 2:
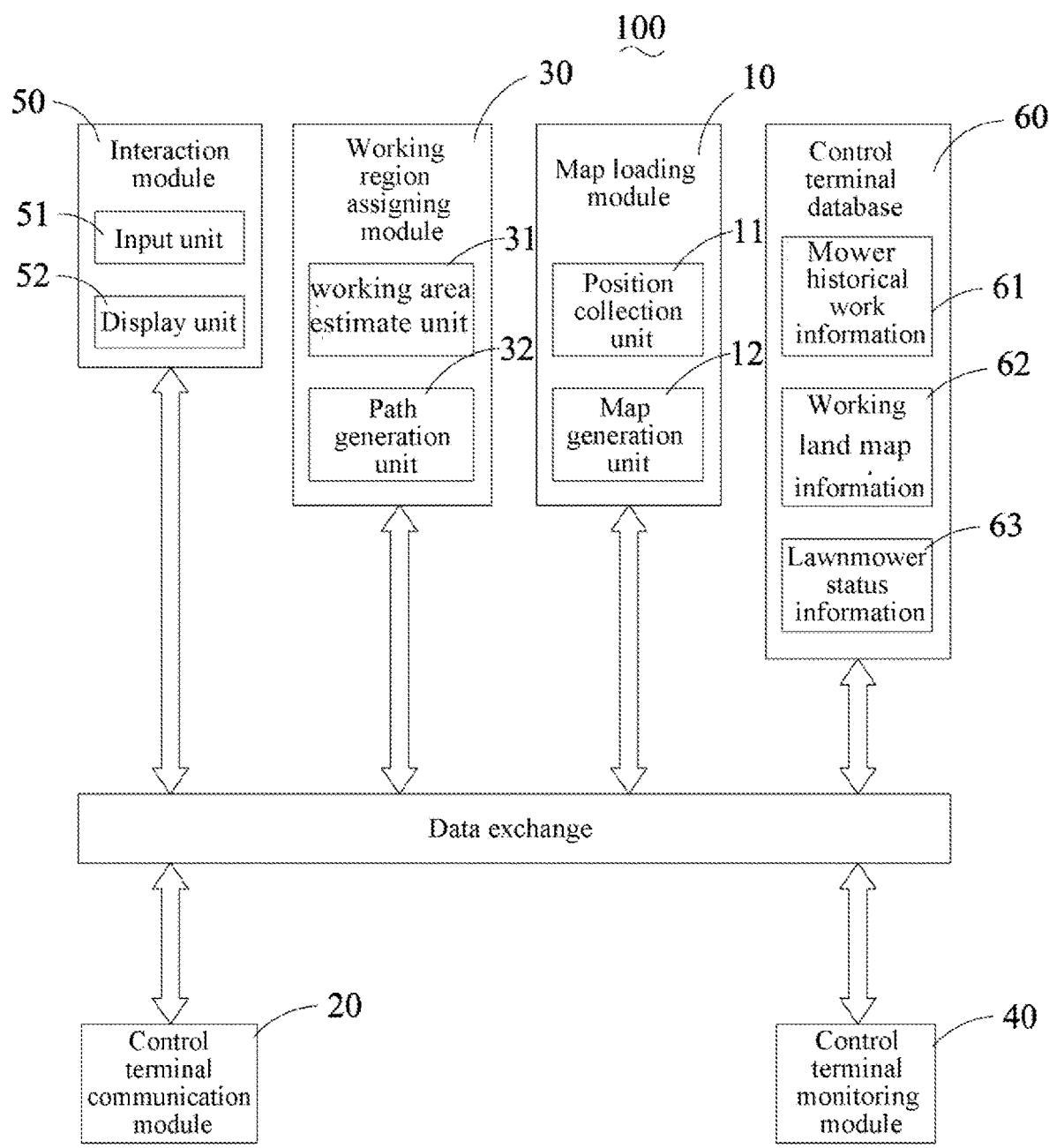
FIG. 2 is a schematic diagram of modules of a mower fleet management device according to an embodiment of the present invention.

Referring to FIG. 1, the mower fleet management device 100 includes a map loading module 10, a control terminal communication module 20, a working region assigning module 30, a control terminal monitoring module 40, an interaction module 50, and a control terminal database 60. The map loading module 10 is configured to acquire a map of a working land for use by the on-board positioning and navigation modules 72. Referring to FIG. 2, the map loading module 10 includes a position collection unit 11 and a map generation unit 12. The position collection unit 11 is configured to collect coordinate information of the working land. Preferably, the coordinate information of the working land includes coordinate information of a boundary of the working land and coordinate information of a boundary of an obstacle located in the working land. The map generation unit 12 is configured to generate a boundary curve of the working land according to the coordinate information and determine whether the boundary curve is a closed curve. If the boundary curve is a closed curve, the map generation unit 12 fits the boundary curve to generates the map of the working land. If the boundary curve is not a closed curve, the map generation unit transmits a prompt message to remind a worker to complete collection of position information of the working land. The prompt message may be a prompt voice emitted by the mower fleet management device 100, a prompt lamplight, or a prompt text, graphics, or the like displayed on the interaction module 50.

Referring to FIG. 1, the control terminal communication module 20 wirelessly communicates with the on-board communication module 71 to acquire status information of the mowers 70 or transmit a control command to the mowers 70. The control terminal communication module 20 and the on-board communication module 71 each may be a 3G communication module, a 4G communication module, a 5G communication module, a WIFI module, a Bluetooth module, a WiMAX module, a Zigbee module, or the like. The status information includes charge amount of battery, speed, mowing widths, and the like of the mowers.

Referring to FIG. 2, the working region assigning module 30 assigns a working region to each of the mowers 70 according to the status information and the map. The on-board positioning and navigation module 72 of each of the mowers 70 guides the mower 70 to work in the corresponding working region according to the assigned working region. The working region assigning module 30 includes a working area estimation unit 31 and a path generation unit 32. The working area estimation unit 31 is configured to estimate the working area of each of the mowers 70 according to the status information. An estimation equation for the working area is: $S_{imax}=B_i*SOC_i*K_i$, where $S_{imax}$ is an estimated working area of an $i^{th}$ mower, $SOC_i$ is a full charge of a battery of the $i^{th}$ mower, $B_i$ is a current charge percentage of the battery of the $i^{th}$ mower, and $K_i$ is a ratio of a mowing area to power consumption of the $i^{th}$ mower. In order to protect the battery and prevent the battery from being damaged as a result of over discharged; a user may set a minimum battery percentage $B_{imin}$ for the battery of the $i^{th}$ mower through the interaction module 50. In this case, the estimation equation for the working area may be changed to $S_{imax}=(B_i-B_{imin})*SOC_i*K_i$ (referred to as Equation 1 below). However, since the mower is working while moving forward, when the mower completes work in a corresponding region, the mower may have been far away from a starting point such as a charging station, a mower shed, or the like. In order to cause the mower to automatically return to the starting point after completion of the work, the mower fleet management device 100 may determine a "back battery percentage" $B_{iback}$ according to a distance between the position of the mower when the work is completed and the starting point. In this case, the estimation equation for working area may be changed to $S_{imax}=(B_i-B_{imin}-B_{iback})*SOC_i*K_i$. In addition, in order to fully mow the lawn, mowing widths corresponding to adjacent mowing tracks need to be partially overlapped. Therefore, preferably, the user may set a re-mowing rate $F_i$ for the $i^{th}$ mower through the interaction module 50. In this case, the estimation equation for the area of the working region may be updated to $S_{imax}=(B_i-B_{imin}-B_{iback})*SOC_i*K_i*(1-F_i)$. Certainly, the area of the working region may also be estimated by other methods. For example, the estimation equation for the working area may also be $S_{imax}=T_1*V_i*D_i*(1-F_i)$ (referred to as Equation 4 below), where $T_i$ is a working time of the $i^{th}$ mower, $V_i$ is a travelling speed of the $i^{th}$ mower during working, and $D_i$ is a mowing width of the $i^{th}$ mower. An evaluation formula for a longest mowing time of the mower under a current power level is $T_{imax}=S_{imax}/[V_i*D_i*(1-F_i)]$ (referred to as Equation 2 below). An estimation formula for a shortest working time (regardless of a charge amount) for a mower fleet composed of n mowers to complete a mowing area S is $T_{imin}=S/[V_1*D_1*(1-F_1)+V_2*D_2*(1-F_2)+ \ldots +V_n*D_n*(1-F_n)]$ (referred to as Equation 3 below). For example, when mowers 1, 2, and 3 listed in Table 1 are used to form a mower fleet, an estimated shortest mowing time and an estimated mowing area of each of the mowers are shown in Table 1. Preferably, when a sum of the estimated working areas of all of the mowers is less than the area of the working land, the working region assigning module 30 transmits a prompt message, to remind the user that the mowers in the current fleet cannot complete the mowing work on the working land. The prompt message may be a prompt voice emitted by the mower fleet management device 100, a prompt lamplight, or a prompt text, graphics, or the like displayed on the interaction module 10. Preferably, when the sum of the estimated working areas of all of the mowers 70 is less than the area of the working land, a user controls, through the interaction module 50, the control terminal communication module 20 to establish a communicative connection to an on-board communication module 71 of a mower outside a fleet to add the mower to the fleet. Then it is determined whether the sum of the estimated working areas of all of the mowers 70 in the current fleet is less than the area of the working land. If the sum of the estimated working areas of all of the mowers 70 in the current fleet is still less than the area of the working land, the user is again reminded to add a new mower to the fleet. The process is repeated until the sum of the estimated working areas of all of the mowers 70 in the current fleet is greater than the area of the working land. In addition, when the sum of the estimated working areas of all of the mowers is less than the area of the working land and no new mower is added to the fleet, a user may select, from the map of the working land through the interaction module 50, a preferential region of the working land. The mower fleet management device 100 controls the mower fleet to work in the preferential region of the working land parcel.

TABLE 1

Working area estimation of a mower fleet composed of mowers 1, 2, and 3

|  | Mower 1 | Mower 2 | Mower 3 |
|---|---|---|---|
| Current battery percentage $B_i$ | 80% | 70% | 90% |
| Minimum battery percentage $B_{imin}$ | 5% | 10% | 15% |
| Full charge amount $SOC_i$(kwh) | 8 | 10 | 15 |
| Mowing area $K_i$(m²/kwh) affordable by a charge amount unit | 1200 | 1400 | 1500 |
| Equation 1 | (80% − 5%)* 8*1200 | (70% − 10%)* 10*1400 | (90% − 15%)* 15*1500 |
| Estimated area $S_{imax}$(m²) of working region | 7200 | 8400 | 16875 |
| Mowing width $D_i$(m) | 0.8 | 0.9 | 1 |

TABLE 1-continued

Working area estimation of a mower fleet composed of mowers 1, 2, and 3

| | Mower 1 | Mower 2 | Mower 3 |
|---|---|---|---|
| Travelling speed $V_i$(m/s) | 4 | 3.5 | 4.5 |
| Re-mowing rate $F_i$ | 10% | 20% | 15% |
| Equation 2 | 7200/(0.8*4* (1 − 10%)) | 8400/(0.9*3.5* (1 − 20%)) | 16875/(1*4.5* (1 − 15%)) |
| Longest mowing time $T_{imax}$(s) affordable by a current charge amount | 2500 | 3333 | 4412 |
| Total mowing area $S_{total}$ | | 28000 | |
| Equation 3 | | 28000/(0.8*4*(1 − 10%) + 0.9*3.5* (1 − 20%) + 1*4.5*(1 − 15%)) | |
| Shortest time $T_{min}$ (regardless of a charge amount) for completing a mowing area $S_{total}$ | | 3035 | |
| Condition determination $T_{1max} < T_{min} < T_{2max} < T_{3max}$ | | | |
| If so, recalculate $S_{remaining}$ | | $S_{remaining} = S_{total} - S_{1max} = 28000 - 7200 = 20800$ | |
| Equation 4 | | 20800/(0.9*3.5*(1 − 20%) + 1*4.5*(1 − 15%)) | |
| Calculate $T_{remaining\ min}$ of a fleet composed of mowers 2 and 3 | | 3278 | |
| Condition determination: $T_{remaining\ min} < T_{2max} < T_{3max}$ | | | |
| If so, $T_{remaning\ min}$ is a shortest time of the fleet | | 3278 | |
| Substitute equation 4 to calculate a mowing area $S_i$ of each mower | 7200 | 3278*0.9* 3.5*(1 − 20%) | 3278*1*4.5* (1 − 15%) |
| Mowing area $S_i$ of each mower | 7200 | 8261 | 12539 |

Figure 3:
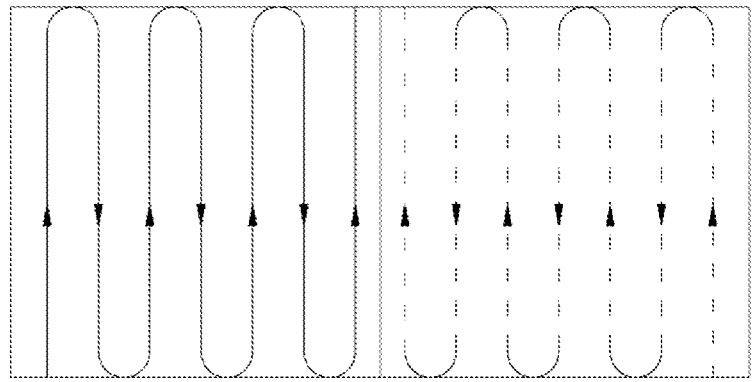
FIG. 3 is a schematic diagram of a working path of an independent working mode.
Figure 4:
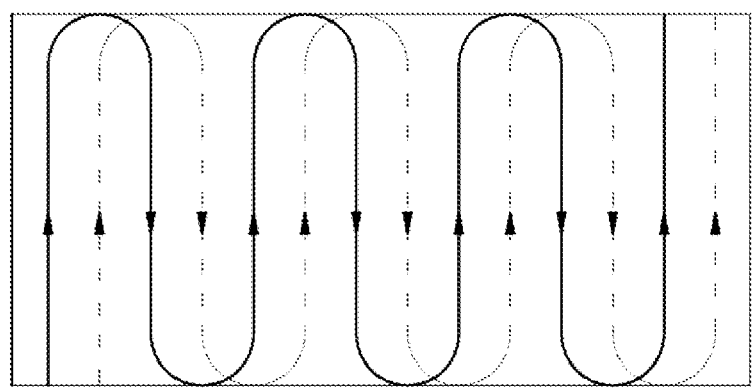
FIG. 4 is a schematic diagram of a working path of a follow-up working mode.

Referring to FIG. 2, the path generation unit 32 generates a working path corresponding to each of the mowers according to the estimated working area and the map of the working land. Preferably, the user may further set a working mode through the interaction module 50. The working mode includes an independent working mode and a follow-up working mode. FIG. 3 is a schematic diagram of a working path of an independent working mode. Solid lines represent a working path of a first mower, and dashed lines represent a working path of a second mower. In the independent working mode, a working region of the first mower and a working region of the second mower are independent of each other. FIG. 4 is a schematic diagram of a working path of a follow-up working mode. Solid lines represent a working path of a first mower, and dashed lines represent a working path of a second mower. In the follow-up working mode, a working region of the first mower and a working region of the second mower are separated from each other. Although there are only two mowers in the independent working mode shown in FIG. 3 and the follow-up working mode shown in FIG. 4, in practical applications, numbers of mowers in the independent working mode and the follow-up working mode may be changed as needed. In the follow-up working mode, in order to fully mow the lawn, a mowing range of the first mower partially overlaps a mowing range of the second mower. In order to avoid mutual influence between the first mower and the second mower, preferably, the first mower and the second mower are caused to operate with a distance between them, that is, the first mower and the second mower work one after the other according to a preset working path. When a front mower malfunctions and stops operation, the mower fleet management device 100 controls a rear mower to stop operation to prevent the rear mower from colliding with the front mower. Preferably, a safety distance is set between the first mower and the second mower, that is, the first mower and the second mower operate at an interval of the safety distance. When the front mower malfunctions and stops operation, the rear mower is capable of decelerating and stopping within the safety distance to avoid a collision as a result of the two being too close. Preferably, the value of the safety distance is proportional to a walking speed of the mowers.

Referring to FIG. 1 and FIG. 2, the control terminal monitoring module 40 is configured to monitor operation information of each of the mowers 70 and control the mower 70 to perform an operation corresponding to the operation information. The operation information may be malfunction information of the mower or charge amount information of the battery. When the control terminal monitoring module 40 monitors that the mower 70 malfunctions, the mower fleet management device 100 controls the mower 70 to stop working and transmits a prompt message. When a malfunction of the malfunctioned mower is resolved, the mower fleet management device 100 guides the mower 70 back to work in the corresponding working region. Referring to FIG. 2, the interaction module 50 includes an input unit 51 configured to input a user instruction, and a display unit 52 configured to display the prompt message. The input unit 51 may be an input key, a voice control module, or the like. The display unit 52 may be a display screen. In this embodiment, the input unit 51 and the display unit 52 are separately disposed. However, in other embodiments, the input unit 51 and the display unit 52 may also be integrated as a whole, such as a touch screen.

Referring to FIG. 2, the control terminal database 60 is configured to store mower historical work information 61, working land map information 62, mower status information 63, and the like, to be viewed by a user or used by the mower fleet management device 100. Preferably, when the mower fleet management device 100 is used, the map loading module 10 preferably loads the working land map information 62. If the working land map information 62 has a map of a land currently to be worked on, the map loading module 10 directly loads the map from the working land map information 62. If the working land map information 62 does not have the map of the land currently to be worked on, the map loading module 10 collects coordinate information of the working parcel and generates a map through fitting.

Figure 5:
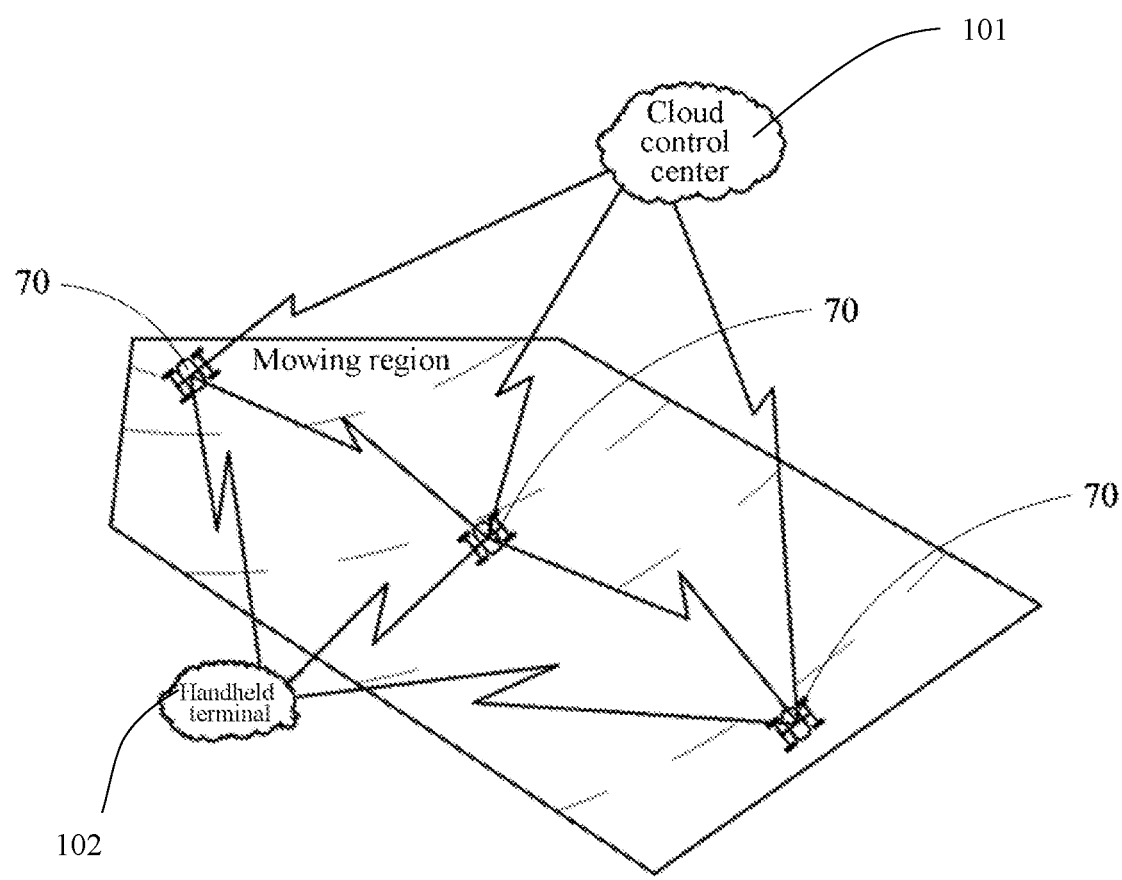
FIG. 5 is a schematic diagram of another embodiment of a mower fleet management system according to the present invention.

The mower fleet management device 100 may be a fixed console, a mobile console, or a cloud console. The mower fleet management device 100 may also be a mobile phone, a tablet computer, or the like. In this embodiment, the mower fleet management device 100 directly communicates with the mower 70. However, in other embodiments, the mower fleet management device 100 may also indirectly communicate with the mower 70. For example, referring to FIG. 5, the mower fleet management device 100 includes a cloud control center 101 and a handheld terminal 102. The handheld terminal 102 may be a mobile phone, a tablet computer, or the like. A user transmits an instruction to the cloud control center 101 through the handheld terminal 102, and then the cloud control center 101 processes the instruction, the mower status information, the working land map, and the like to generate control information and transmits the control information to the mower 70. Such a configuration can effectively utilize powerful data processing capabilities of cloud computing and supercomputers, so that the data processing capability required of the handheld terminal 102 is reduced, thereby miniaturizing the handheld terminal 102. In this way, the handheld terminal 102 is reduced in size, making it convenient for the user to carry, and has lower production costs without degrading user experience. Moreover, such a configuration can further enable a plurality of mower fleet management devices to share one cloud control center 101, thereby reducing overall operation costs.

Compared with the prior art, the mower fleet management device 100 of the present invention can control a plurality of unmanned mowers to work in collaboration, thereby effectively improving working efficiency and reducing labor costs.

Figure 6:
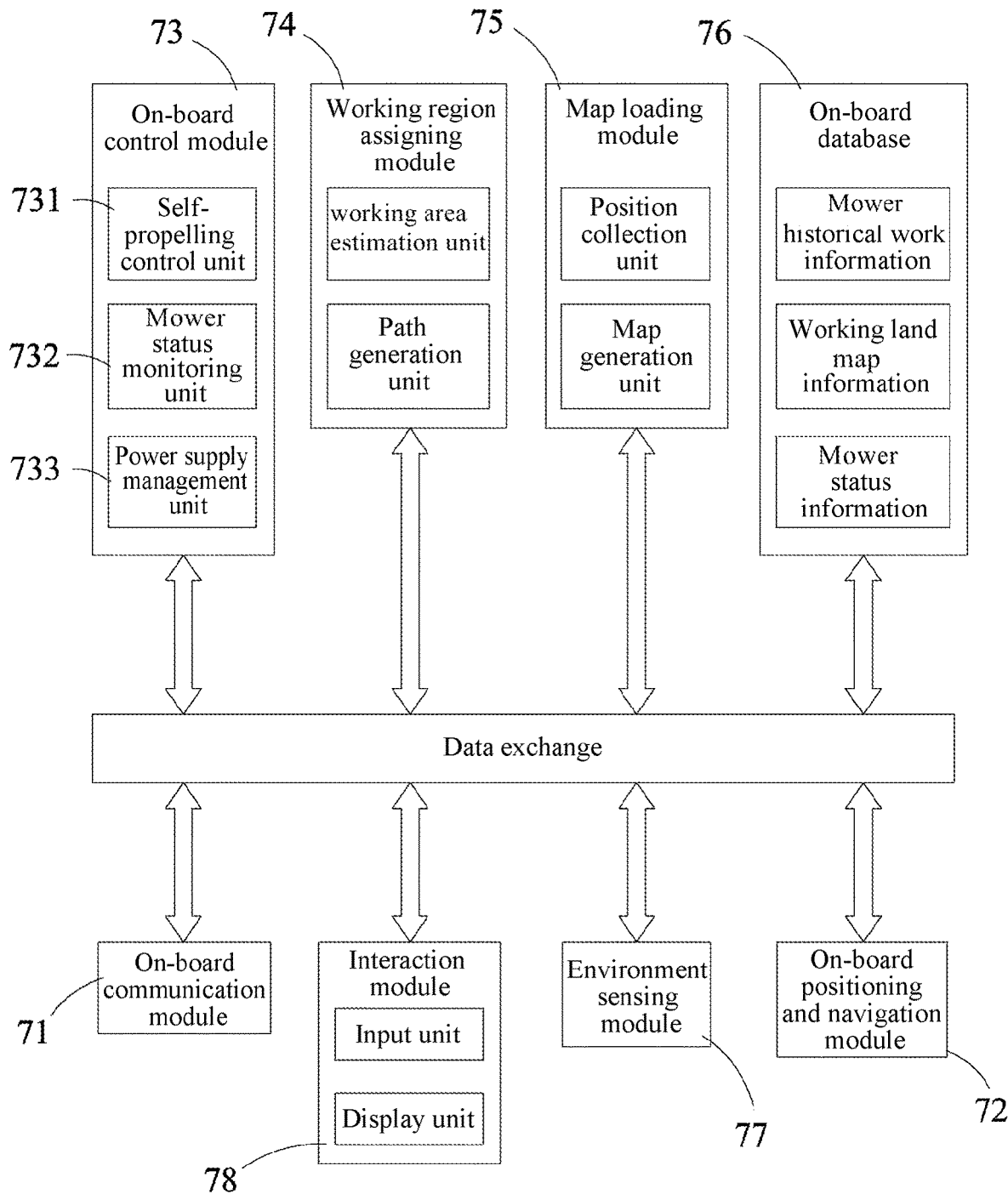
FIG. 6 is a schematic diagram of modules of a mower according to an embodiment of the present invention.

In this embodiment, the map loading module 10 and the working region assigning module 30 are disposed on the mower fleet management device 100. However, in other embodiments, the map loading module 10 and the working region assigning module 30 may also be disposed on the mower 70. For example, referring to FIG. 6, the mower 70 includes an on-board communication module 71, an on-board positioning and navigation module 72, an on-board control module 73, a working region assigning module 74, a map loading module 75, an on-board database 76, an environment sensing module 77, and an interaction module 78. The on-board communication module 71 is configured to communicate with the control terminal communication module 20. The on-board positioning and navigation module 72 is configured to guide the mower 70 to work on a corresponding working land. The on-board control module 73 includes a self-propelling control unit 731 configured to control a vehicle to automatically propel, a mower status monitoring unit 732 configured to monitor a status of the mower, and a power supply management unit 733. Functions of the working region assigning module 74, the map loading module 75, the on-board database 76, and the interaction module 78 are the same as those of the working region assigning module 30, the map loading module 10, the control terminal database 60, and the interaction module 50. Details are not described here again. The environment sensing module 77 is configured to gather environment information around the mower 70, such as terrain information, obstacle information, and the like. The environment sensing module 77 may be a lidar, vision camera, ultrasonic wave radar, millimeter wave radar, or the like.

Figure 7:
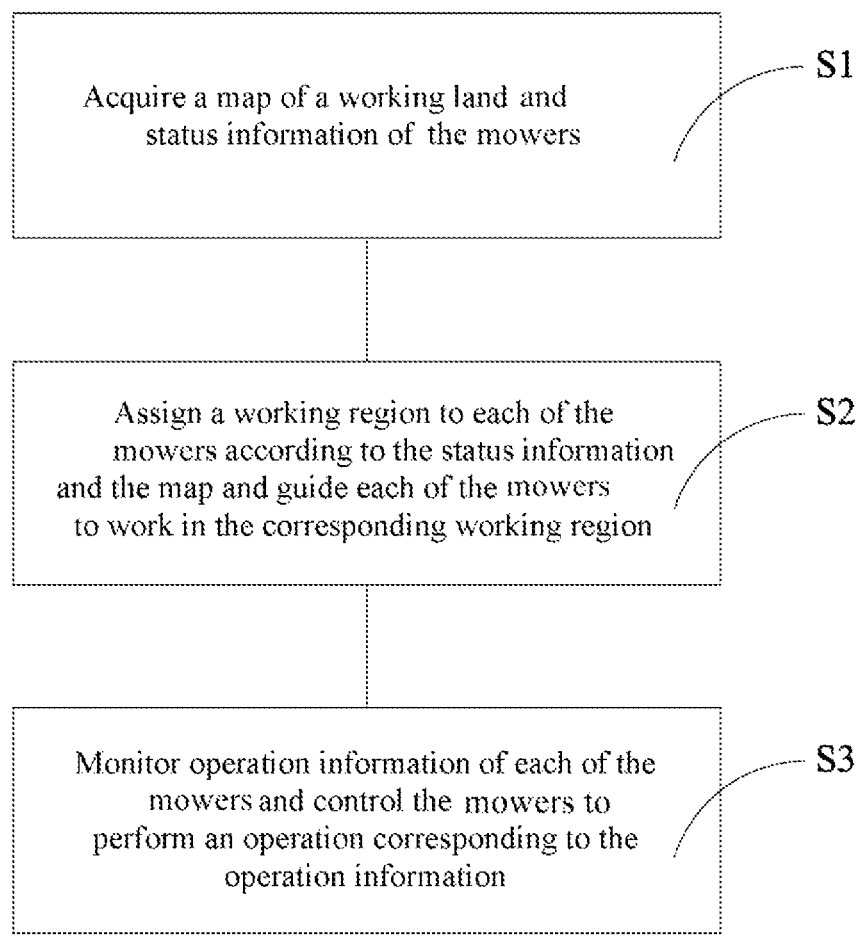
FIG. 7 is a flowchart showing various steps of a mower fleet management method according to an embodiment of the present invention.

Referring to FIG. 7, the present invention further discloses a mower fleet management method for controlling a plurality of mowers to work in collaboration. The mower fleet management method includes the following steps:

S1: Acquiring a map of a working land and status information of the plurality of mowers, wherein the status information includes charge amount of battery, speed and mowing widths of the plurality of mowers.

S2: Assigning a working region to each of the plurality of mowers according to the status information and the map and guiding each of the plurality of mowers to work in the corresponding working region.

S3: Monitoring operation information of each of the plurality of mowers and controlling the mower to perform an operation corresponding to the operation information. The operation information may be malfunction information or charge amount information of the battery. When the mower malfunctions, the mower is controlled to stop working and transmit a prompt message. When any of the mowers in the fleet completes work in its corresponding working region and the mower still has remaining battery power, the mower is guided to work in the working region corresponding to the malfunctioned mower. When the battery of the mower has insufficient power and the mower has not completed work or the mower has completed work, the mower is guided to a preset position for charging or replacement of the battery. Such a configuration can effectively avoid a requirement of manpower to retrieve the mower for charging or replacement of the battery, thereby reducing labor required of the user and improving user experience.

Specifically, step S1 also includes the following steps:

S10: Determining whether the map corresponding to the working land is present; and if so, performing step S2.

S11: Acquiring coordinate information of the working land.

S12: Generating a boundary curve of the working land according to the coordinate information. Preferably, it is determined whether the boundary curve is a closed curve; and if so, step S13 is performed; if not, step S11 is performed.

S13: Fitting the boundary curve to generate the map of the working land.

In order to acquire detailed map information of the working land, preferably, step S11 further includes the following steps:

S111: Acquiring coordinate information of a boundary of the working land.

S112: Acquiring coordinate information of a boundary of an obstacle in the working land. Specifically, step S2 also includes the following steps:

S21: Estimating the working area of each of the plurality of mowers according to the status information of each of the plurality of mowers.

S22: Generating a working path of each of the mowers according to the estimated working area of each of the mowers and the map of the working land.

Preferably, step S21 further includes the following steps:

S211: Estimating the working area of each of the mowers.

S212: Determining whether the sum of the estimated working areas of all of the mowers is not less than the area of the working land; and if so, performing step S22.

S213: Determine whether a mower outside the fleet is needed to be added, if so, adding the mower outside the fleet to the current fleet and performing step S211.

S214: Selecting a preferential region of the working land from the map of the working land.

Referring to FIG. 1, the present disclosure further provides a mower fleet management system 200, including a mower fleet 201 and the mower fleet management device 100. The mower fleet 201 comprises a plurality of mowers 70, wherein each of the plurality of mowers 70 includes the on-board communication module 71 and the on-board positioning and navigation module 72.

In conclusion, the mower fleet management device 100 of the present disclosure can remotely control a plurality of unmanned mowers to work in collaboration, thereby effectively improving working efficiency and reducing labor costs.

While particular elements, embodiments, and applications of the present invention have been shown and described, it is understood that the invention is not limited thereto because modifications may be made by those skilled in the art, particularly in light of the foregoing teaching. It is therefore contemplated by the appended claims to cover such modifications and incorporate those features which come within the spirit and scope of the invention.

What is claimed is:

1. A mower fleet management device configured to control a plurality of mowers to work in collaboration, each of the plurality of mowers comprising an on-board communication module, and an on-board positioning and navigation hardware, wherein the mower fleet management device comprises:
   a map loading module configured to acquire a map of a working land for use by the on-board positioning and navigation hardware;
   a control terminal communication module configured to wirelessly communicate with the on-board communication modules to acquire status information of the plurality of mowers or transmit a control command to the plurality of mowers, wherein the status information comprises at least one of charge amount of battery, speed and mowing widths of the plurality of mowers; and
   a working region assigning module configured to assign a working region to each of the plurality of mowers according to the status information and the map; wherein the on-board positioning and navigation hardware of each of the plurality of mowers is configured to guide each mower to work in the working region assigned by the working region assigning module,
   wherein the working region assigning module comprises a working area estimation unit and a path generation unit, the working area estimation unit is configured to estimate a working area value of each of the mowers according to the status information, and the path generation unit is configured to generate a working path according to the estimated working area value and the map of the working land,
      when a sum of the estimated working area values of all of the mowers is less than an area value of the working land, the working region assigning module transmits a prompt message;
   wherein, an estimation equation for the working area is:

$$S_{imax}=B_i*SOC_i*K_i, \text{ or}$$

$$S_{imax}=(B_{imin}-B_{iback})*SOC_i*K_i, \text{ or}$$

$$S_{imax}=(B_{imin}-B_{iback})*SOC_i*K_i*(1-F_i),$$

wherein $S_{imax}$ is an estimated working area of an $i^{th}$ mower, $B_i$ is a current battery percentage of the battery of the $i^{th}$ mower, and $K_i$ is a ratio of a mowing area to power consumption of the $i^{th}$ mower, $SOC_i$ is a full charge of a battery of the $i^{th}$ mower, $B_{imin}$ is a preset minimum battery percentage for the battery of the $i^{th}$ mower, $B_{iback}$ is a preset back battery percentage according to a distance between a position of the mower when work completed and a starting point, $F_i$ is a preset re-mowing rate for the $i^{th}$ mower.

2. The mower fleet management device according to claim 1, wherein the map loading module comprises a position collection unit and a map generation unit, wherein the position collection unit is configured to collect coordinate information of the working land, and the map generation unit is configured to generate a boundary curve of the working land according to the coordinate information and fit the boundary curve to generate the map of the working land.

3. The mower fleet management device according to claim 2, wherein the coordinate information of the working land comprises coordinate information of a boundary of the working land and coordinate information of a boundary of an obstacle located in the working land.

4. The mower fleet management device according to claim 2, wherein the map generation unit is configured to: determine whether the boundary curve is a closed loop; and if so, fit the boundary curve to generate the map of the working land; or if not, transmit a prompt message to remind a worker to complete collection of position information of the working land.

5. The mower fleet management device according to claim 1, further comprising an interaction module, wherein when the sum of the estimated working area values of all of the mowers is less than the area value of the working land, according to a user's input to the interaction module, the control terminal communication module is controlled to establish communication with an on-board communication module of a mower outside the fleet to add the mower outside the fleet to the fleet.

6. The mower fleet management device according to claim 1, further comprising an interaction module, wherein when the sum of the estimated working area values of all of the mowers is less than the area value of the working land, from the map of the working land through the interaction module, a preferential region of the working land is selected, and the mower fleet management device controls a mower fleet to work in the preferential region of the working land.

7. The mower fleet management device according to claim 1, further comprising a control terminal monitoring module to monitor operation information of each of the mowers, wherein when any of the mowers malfunction, the mower fleet management device transmits a prompt message.

8. The mower fleet management device according to claim 7, wherein a safety distance is set between two of the mowers that have partially overlapping mowing regions, so that when a front mower of the two mowers malfunctions and stops operation, a rear mower of the two mowers is capable of decelerating and stopping within the safety distance to avoid a collision as a result of the two being too close.

9. The mower fleet management device according to claim 1, wherein
   an estimation equation for the working area value is: $S_{imax}=(B_i-B_{imin})*SOC_i*K_i$, wherein $S_{imzx}$ is an estimated working area of an $i^{th}$ mower, $B_i$ is a current battery percentage of the battery of the $i^{th}$ mower, and $K_i$ is a ratio of a mowing area to power consumption of the $i^{th}$ mower, $SOC_i$ is a full charge of a battery of the $i^{th}$ mower, $B_{imin}$ is a preset minimum battery percentage for the battery of the $i^{th}$ mower.

10. A mower fleet management method for controlling a plurality of mowers to work in collaboration, the method comprising:
   acquiring a map of a working land and status information of the plurality of mowers, wherein the status information comprises at least one of charge amount of battery, speed and mowing widths of the plurality of mowers; and
   assigning a working region to each of the mowers according to the status information and the map and guiding each of the mowers to work in the corresponding working region;
   evaluating working area value of each of the plurality of mowers according to the status information of each of the plurality of mowers;
   generating a working path of each of the plurality of mowers according to the estimated working area value of each of the plurality of mowers and the map of the working land;

estimating the working area value of each of the plurality of mowers; and determining whether a sum of the estimated working area values of all of the plurality of mowers is not less than an area value of the working land; and if so, generating a working path of each of the plurality of mowers according to the estimated working area value of each of the plurality of mowers and the map of the working land, or determining whether a mower outside the fleet is needed to be added; and if so, adding the mower outside the fleet to a current fleet and evaluating working area value of each of the plurality of mowers according to the status information of each of the plurality of mowers;

wherein, an estimation equation for the working area is:

$$S_{imax}=B_i*SOC_i*K_i, \text{ or}$$

$$S_{imax}=(B_i-B_{imin}-B_{iback})*SOC_i*K_i, \text{ or}$$

$$S_{imax}=(B_i-B_{imin}-B_{iback})*SOC_i*K_i*(1-F_i),$$

wherein $S_{imax}$ is an estimated working area of an $i^{th}$ mower, $B_i$ is a current battery percentage of the battery of the $i^{th}$ mower, and $K_i$ is a ratio of a mowing area to power consumption of the $i^{th}$ mower, $SOC_i$ is a full charge of a battery of the $i^{th}$ mower, $B_{imin}$ is a preset minimum battery percentage for the battery of the $i^{th}$ mower, $B_{iback}$ is a preset back battery percentage according to a distance between a position of the mower when work completed and a starting point, $F_i$ is a preset re-mowing rate for the $i^{th}$ mower.

11. The mower fleet management method according to claim 10, the method further comprising:
   acquiring coordinate information of the working land;
   generating a boundary curve of the working land according to the coordinate information; and
   fitting the boundary curve to generate the map of the working land.

12. The mower fleet management method according to claim 11, the method further comprising:
   acquiring coordinate information of a boundary of the working land; and
   acquiring coordinate information of a boundary of an obstacle in the working land.

13. The mower fleet management method according to claim 11, the method further comprising:
   determining whether the boundary curve is a closed loop; and
   if so, fitting the boundary curve to generate the map of the working land; or if not, acquiring coordinate information of the working land.

14. The mower fleet management method according to claim 10, wherein the method further comprises:
   selecting, by a user, a preferential region of the working land parcel from the map of the working land parcel.

15. The mower fleet management method according to claim 10, wherein the mower fleet management method further comprises:
   monitoring operation information of each of the plurality of mowers and controlling the mower to perform an operation corresponding to the operation information.

16. The mower fleet management method according to claim 15, wherein
   when any of the mowers in the fleet completes work in the corresponding working region and the mower still has remaining battery power, the mower is guided to work in the working region corresponding to a malfunctioned mower, wherein the operation information includes malfunction information, and when the mower malfunctions, the mower stops working and transmits a prompt message.

17. A mower fleet management system, comprising:
   a mower fleet comprising a plurality of mowers, wherein each of the plurality of mowers comprises an on-board communication module and an on-board positioning and navigation hardware; and
   a mower fleet management device comprising:
      a map loading module configured to acquire a map of a working land for use by the on-board positioning and navigation hardware;
      a control terminal communication module configured to communicate with the on-board communication modules to acquire status information of the mowers or transmit a control command to the mowers, wherein the status information comprises at least one of charge amount of battery, speed and mowing widths of the plurality of mowers; and
      a working region assigning module configured to assign a working region to each of the plurality of mowers according to the status information and the map; wherein
   the on-board positioning and navigation hardware of each of the plurality of mowers is configured to guide each mower to work in the working region assigned by the working region assigning module;
   the working region assigning module comprises a working area estimation unit and a path generation unit, wherein the working area estimation unit is configured to estimate a working area value of each of the mowers according to the status information, and the path generation unit is configured to generate a working path according to the estimated working area value and the map of the working land; when a sum of the estimated working area values of all of the mowers is less than an area value of the working land, the working region assigning module transmits a prompt message;

wherein, an estimation equation for the working area is:

$$S_{imax}=B_i*SOC_i*K_i, \text{ or}$$

$$S_{imax}=(B_i-B_{imin}-B_{iback})*SOC_i*K_i, \text{ or}$$

$$S_{imax}=(B_i-B_{imin}-B_{iback})*SOC_i*K_i*(1-F_i),$$

wherein $S_{imax}$ is an estimated working area of an $i^{th}$ mower, $B_i$ is a current battery percentage of the battery of the $i^{th}$ mower, and $K_i$ is a ratio of a mowing area to power consumption of the $i^{th}$ mower, $SOC_i$ is a full charge of a battery of the $i^{th}$ mower, $B_{imin}$ is a preset minimum battery percentage for the battery of the $i^{th}$ mower, $B_{iback}$ is a preset back battery percentage according to a distance between a position of the mower when work completed and a starting point, $F_i$ is a preset re-mowing rate for the $i^{th}$ mower.

18. The mower fleet management device according to claim 9, wherein
   an evaluation formula for a longest mowing time of the mower under a current power level is $T_{imax}=S_{imax}/[V_i*D_i*(1-F_i)]$, $V_i$ is a travelling speed of the $i^{th}$ mower during working, and $D_i$ is a mowing width of the $i^{th}$ mower, $F_i$ is a preset re-mowing rate for the $i^{th}$ mower,
   an estimation formula for a shortest working time regardless of a charge amount for a mower fleet composed of n mowers to complete a mowing area S is $T_{imin}=S/[V_1*D_1*(1-F_1)+V_2*D_2*(1-F_2)+\ldots+V_n*D_n*(1-F_n)]$, a second estimation equation for the working area value is $S_{imax} = T_i * V_i * D_i * (1-F_i)$, wherein $T_i$ is a working time of the $i^{th}$ mower.

* * * * *